United States Patent [19]

Imanaka

[11] Patent Number: 4,799,206

[45] Date of Patent: Jan. 17, 1989

[54] TRACKING CONTROL APPARATUS FOR RECORDING DISC REPRODUCING APPARATUS

[75] Inventor: Ryoichi Imanaka, Osaka, Japan

[73] Assignee: Matsushita Electric Industrial Co., Ltd., Osaka, Japan

[21] Appl. No.: 667,485

[22] PCT Filed: Feb. 22, 1984

[86] PCT No.: PCT/JP84/00065

§ 371 Date: Oct. 22, 1984

§ 102(e) Date: Oct. 22, 1984

[87] PCT Pub. No.: WO84/03387

PCT Pub. Date: Aug. 30, 1984

[30] Foreign Application Priority Data

Feb. 22, 1983 [JP] Japan .................... 58-27912

[51] Int. Cl.$^4$ .................... G11B 7/08; G11B 21/10
[52] U.S. Cl. .................... 369/44
[58] Field of Search .................... 369/44, 45, 46; 350/6.3, 252, 255, 247

[56] References Cited

U.S. PATENT DOCUMENTS

| | | | |
|---|---|---|---|
| 4,236,232 | 11/1980 | Jansen et al. | 369/44 |
| 4,419,614 | 12/1983 | Kimura | 369/45 |
| 4,473,274 | 9/1984 | Yano et al. | 350/255 |
| 4,489,406 | 12/1984 | Hsieh et al. | 369/44 |
| 4,494,154 | 1/1985 | Akiyama | 369/46 |
| 4,506,149 | 3/1985 | Utsumi | 369/44 |
| 4,556,964 | 12/1985 | Trethewey | 369/44 |
| 4,566,089 | 1/1986 | Kime | 369/45 |
| 4,571,026 | 2/1986 | Maruta | 350/247 |
| 4,614,863 | 9/1986 | Sato | 369/46 |
| 4,627,040 | 12/1986 | Arai et al. | 369/44 |

FOREIGN PATENT DOCUMENTS

| | | |
|---|---|---|
| 0063830 | 11/1982 | European Pat. Off. . |
| 0070070 | 1/1983 | European Pat. Off. . |
| 52-48912 | 4/1977 | Japan . |
| 53-120403 | 10/1978 | Japan . |
| 57-122029 | 7/1982 | Japan . |
| 57-191840 | 11/1982 | Japan . |
| 588677 | 5/1947 | United Kingdom . |
| 2086092 | 5/1982 | United Kingdom . |

OTHER PUBLICATIONS

Journal of the Audio Engineering Society, vol. 28, No. 6, Jun. 1980, pp. 429-432, New York, US; K. Okada et al.: "A New PCM Audio Disk Pickup Employing a Laser Diode", FIG. 1; p. 340, paragraph 2.2.

Primary Examiner—Donald McElheny, Jr.
Attorney, Agent, or Firm—Lowe, Price, LeBlanc, Becker & Shur

[57] ABSTRACT

This invention relates to tracking control apparatus for a recording disc reproducing apparatus in which recorded information is successively reproduced from a disc-like recording medium, which is rotated and driven, by way of a pickup means, and the invention provides a tracking control apparatus which is hardly affected by disturbance, such as vibrations, without deteriorating information-track-tracking characteristics of the pickup means by feeding back a detected output corresponding to a displacement of the pickup means from a reference position, to a first servo loop which controls the pickup means so as to scan along an information track to be reproduced using a tracking signal corresponding to a relative position between the pickup means and the information track.

18 Claims, 6 Drawing Sheets

FIG. 8

TRACKING CONTROL APPARATUS FOR RECORDING DISC REPRODUCING APPARATUS

TECHNICAL FIELD

This invention relates to tracking control apparatus for recording disc reproducing apparatus which reproduces successively recorded information from a rotatably driven disc-like recording medium (which will be referred to as a disc hereinbelow), by way of a pickup means, wherein the pickup means is scanned with satisfactory tracking along an information track on a disc, while the tracking characteristic is maintained stable irrespective of application of external impact thereto.

TECHNICAL BACKGROUND

Since spiral information tracks recorded on a disc are apt to be eccentric with respect to a center hole of the disc, means for causing a reproducing means to scan along information tracks, which means is called a tracking servo, has hitherto been required in order to reproduce tracks of such a disc.

Since such tracking servo is well known, a detailed description of the structure thereof is omitted.

Figure 1:
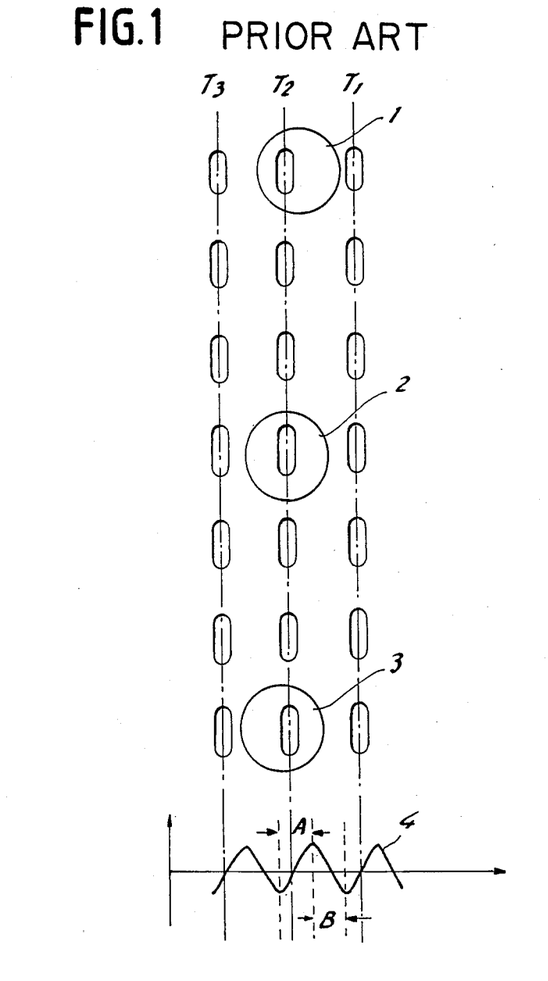
FIG. 1 is a diagram showing the relationship between the irradiating points of light beams applied to an information track and a tracking control signal.

FIG. 1 is an explanatory diagram for the principle of a servo system using three beams, which is a system of a tracking servo for an optical disc used for obtaining a reproduced signal by way of a light beam. In FIG. 1, the reference $T_1$, $T_2$ and $T_3$ are information tracks of a disc; 2 is a light beam for reading; and 1 and 3 are auxiliary beams for detecting tracking signal, and the difference between reproduced outputs of the auxiliary beams 1 and 3 is detected using a differential amplifier so as to obtain a tracking signal 4 shown in FIG. 1. In the above, since the information tracks $T_1$, $T_2$ and $T_3$ are moving relative to the light beams 1, 2 and 3 due to the eccentricity of the disc, the tracking signal 4 shown in FIG. 1 is obtained. A range "A" within the tracking signal 4 indicates that the beams 1, 2 and 3 are scanning the track $T_2$, a range "B" indicates that a portion between the tracks $T_1$ and $T_2$ is being scanned.

Figure 2:
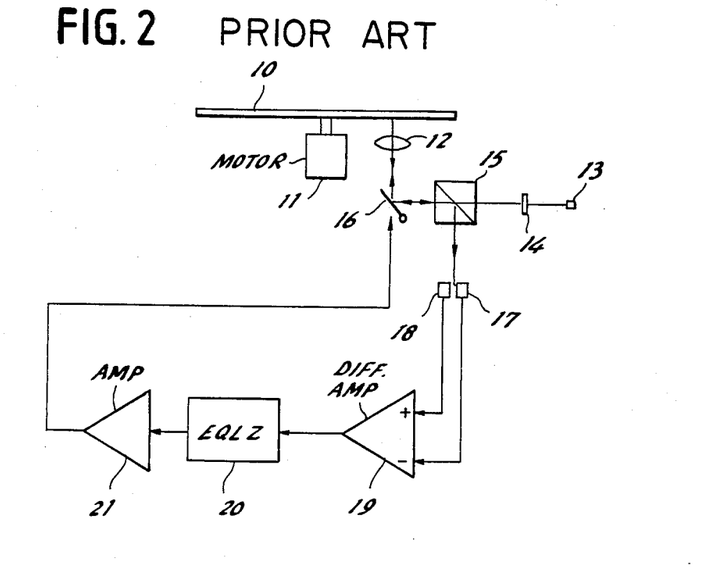
FIG. 2 is a block diagram showing a fundamental structure of a conventional tracking control apparatus.

FIG. 2 is a structural diagram of the tracking servo. The reference 10 is a disc; 11 is a motor for rotating the disc 10; 12 is a reading lens; 13 is a light source used so that the disc 10 is irradiated by auxiliary beams 1, 2, 3 for tracking as shown in FIG. 1 using a diffraction grating 14. The reference 15 is a beam splitter; 16 is a tracking mirror, and these elements are used for controlling the position of the light beam so that the reading light beam, which is focussed on the disc 10 by way of the reading lens 12, is always on a track. The references 17 and 18 are photo detectors for receiving reproduced outputs of the auxiliary beams 1 and 3 shown in FIG. 1, and the tracking signal 4 of FIG. 1 is obtained at an output of a differential amplifier 19. The reference 20 is an equalizer which is a filter for correcting the characteristic of the tracking servo system. The reference 21 is a D.C. amplifier which supplies a current corresponding to the output from the equalizer 20 so as to effect tracking control wherein the deflecting angle of the tracking mirror 16 is controlled.

Assuming that the rotational speed of the disc 10 is 1800 rpm, the eccentricity of the disc 10 has a harmonic component of a fundamental wave of 30 Hz, and therefore, the tracking mirror 16 has to be operated so as to scan an information track of the disc 10 by the reading light beam 2 of FIG. 1 by tracking the eccentricity. As a result, at least the band of tracking servo is required to cover all the harmonic components of the above-mentioned eccentricity. For instance, assuming that 30 Hz component of eccentricity is 100 micron and 1 kHz component is 2 micron, the reading light beam 2 has to follow the information track of the disc 10 with an accuracy of ±0.1 micron. Therefore, the gain of the tracking servo at 30 Hz is required to be 100/0.2=500, and the gain at 1 kHz is required to be 2/0.2=10 (wherein 0.2 means ±0.1 micron). In this way the tracking servo band width and gain of the same are selected.

Figure 3:
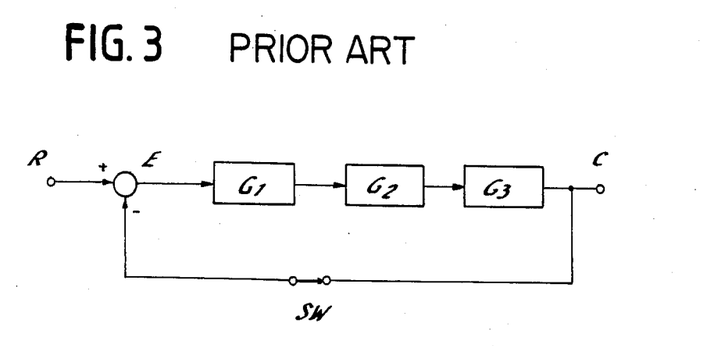
FIG. 3 is a block diagram for the description of the operation of the same.

FIG. 3 illustrates a block diagram of the tracking servo system described with reference to FIG. 2. The reference R is a signal indicative of the position of an information track of the disc; the reference C, a signal indicative of the position of the reading light beam, and the difference between these signals becomes an error signal E, and therefore, the tracking servo system can be expressed as a servo system in which the tracking mirror G3 is controlled through the equalizer G1 and the D.C. amplifier G2. In the above, G1, G2 and G3 respectively indicate transfer functions. The reference SW is a switch which is arranged to cut the signal C temporarily for the description of malfunction.

Figure 4A:
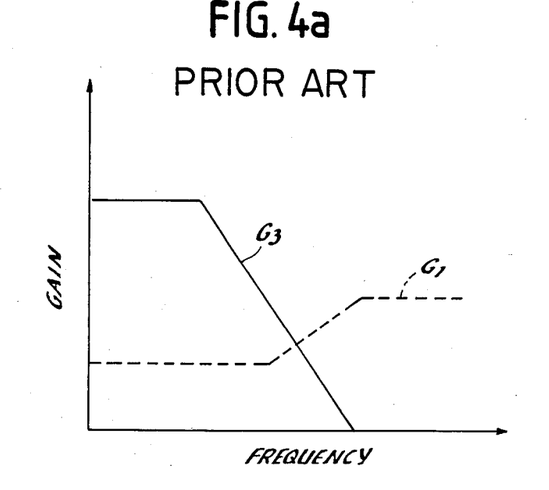
FIGS. 4a and 4b are characteristic diagrams for the description of the operation of the same.
Figure 4B:
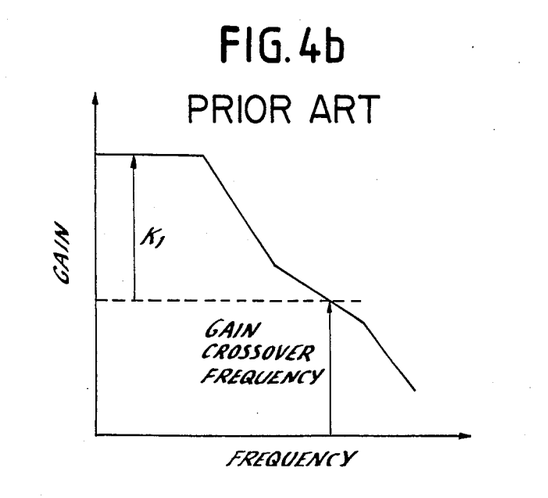

FIG. 4a shows a frequency response of the above-mentioned equalizer and tracking mirror G1, G3 and it is assumed that the frequency response of the DC amplifier G2 is flat for simplicity. FIG. 4b shows open-loop characteristic of the block diagram shown in FIG. 3, and the reference K1 indicates the open-loop gain.

While the conventional tracking servo has been described in the above, when a defect, such as a scratch at the information track(s) of the disc, exits, the signal C of FIG. 3 indicative of the position of the light beam cannot be detected, and this phenomenon can be considered as the switch SW in the block diagram of the tracking servo (see FIG. 3) is cutoff for a given period of time. Such a phenomenon can be actualized by painting ink by a felt pen on a disc, and when the size of a defect becomes larger than a given size, the tracking servo malfunctions resulting in the occurrence of track jumping and locked group. Analyzing this phenomenon, the following points have been made clear.

(1) When gain crossover frequency in the tracking servo is made high, stability against disturbance, such as vibrations applied to a disc player, is satisfactory although malfunction is apt to occur with a small defect.

(2) When gain crossover frequency is made low within a range where disc eccentricity tracking is available, malfunctions due to defects are few and far between. However, stability against disturbance, such as vibrations applied to a disc player, is unsatisfactory.

Figure 5:
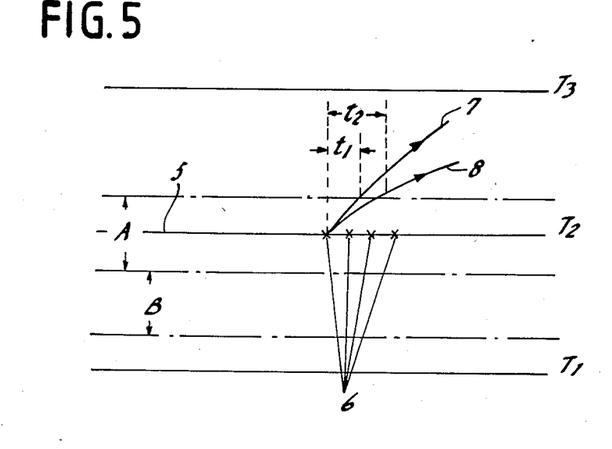
FIG. 5 is a top plan view for the description of tracking condition.

This can be explained with reference to FIG. 5 which corresponds to FIG. 1, and center lines of information tracks are indicated at the references T1, T2 and T3. Regions A and B in FIG. 1 correspond to regions A and B in FIG. 5. Let us assume that the reading light beam 2 is scanning the track T2 in a direction of an arrow 5 by way of the tracking servo. The reference 6 indicates defects on the track, and at this defect 6 portion the switch SW in FIG. 3 is cutoff resulting in the occurrence of the tracking servo causing jumping in a direction of an arrow 7 or 8 depending on the characteristic of the servo. In the case that the band width of the open-loop characteristic expressed in terms of G1xG2xG3 of FIG. 3 is wide, jumping results suddenly as shown by the arrow 7 so as to jump out of the region A with time t1. On the other hand, when the band width of the open-loop characteristic is narrow, jumping results slowly as shown by the arrow 8 so as to jump out of the region A with time t2. Namely, since the error signal E is amplified by G1, G2 and G3, the time for jumping out of the region A is determined by the frequency response of G1, G2 and G3.

The region A, as will be understood from FIG. 1, is a dynamic range of the tracking servo, in which the reading beam can be held on the track T2, while the region B is an unstable range in which the polarity of the tracking servo is inverted. Therefore, if the size of the defect 6 is larger than t1, t2, the reading beam is off the track as indicated by the arrows 7 and 8, respectively. If the size of the defect 6 is smaller than the same, then the reading beam is again held on T2.

In this way, while the occurrence of malfuntion due to track defect can be reduced if the band width of the open-loop characteristic of the tracking servo is made narrow and the gain crossover frequency is made low, the operation of the tracking servo becomes unstable in conection with a disc with large eccentricity, while the tracking servo malfunctions when disturbance, such as vibrations, is applied to the disc player.

DISCLOSURE OF THE INVENTION

The present invention has been developed in view of the above, and contemplates to provide a reproduce pickup and a tracking servo which are stable against information track defects of discs, and sufficiently stable against disturbance, such as vibrations, applied to a disc player. To this end, the reproduce apparatus according to the present invention comprises pickup means for reproducing information signals from information tracks on a disc which is rotated and driven; means for producing a tracking control signal corresponding to the relative position between the pickup means and said information track; pickup drive means for moving said pickup means in accordance with said tracking control signal; means for detecting an output corresponding to the displacement of said pickup; and means for feeding back a detected output corresponding to said displacement to said pickup drive means.

BEST MODE FOR PRACTICING THE INVENTION

Figure 6:
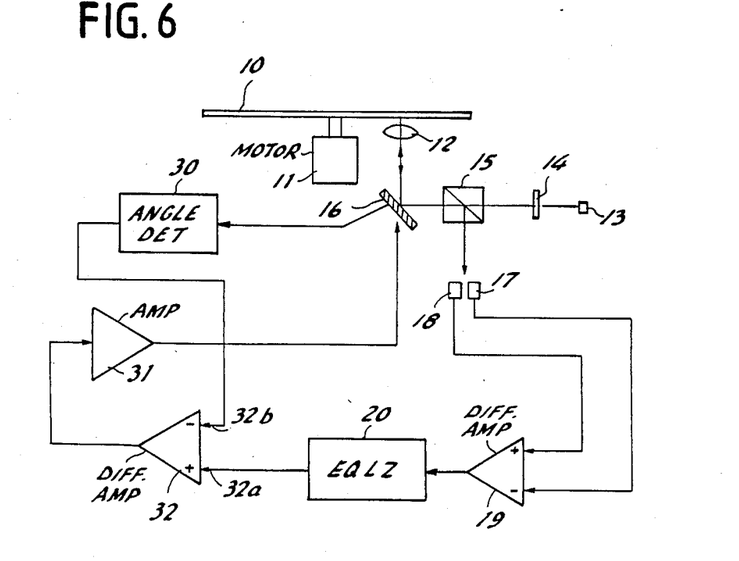
FIG. 6 is a block diagram showing a fundamental structure of the tracking control apparatus according to the present invention.

FIG. 6 shows a structual diagram of an embodiment of the present invention. Blocks in FIG. 6 having the same designating references are the same as those in FIG. 2.

The reference 30 is an angle detecting device for detecting an angle of a tracking mirror 16, which angle detecting device 30 supplies a voltage corresponding to a swing angle of the tracking mirror 16 to a second differential amplifier 32. An output of first differential amplifier 19 is inputted via equalizer 20 to the above-mentioned second differential amplifier 32 whose output is fed via a drive amplifier 31 to the tracking mirror 16.

Describing the operation, reflected light of the tracking light beams, which are designated at 1 and 3 in FIG. 1, from the disc is applied to photo detectors 17 and 18 so that a tracking signal is obtained at the output of the first differential amplifier 19. The tracking signal is inputted to one input terminal 32a of the second differential amplifier 32 after the response characteristic of the tracking servo is corrected by way of equalizer 20. The tracking signal fed to the second differential amplifier 32 is fed via the drive amplifier 31 to drive and control the tracking mirror 16. The swing angle of the tracking mirror 16 is detected by the angle detector 30, and is inputted to the other input terminal 32b of the second differential amplifier 32. Assuming that a voltage of +1V is outputted at the output of the equalizer 20, since operation is performed so that the difference between the input terminals 32a and 32b of the second differential amplifiers 32 equals zero, the angle of the tracking mirror 16 is controlled so that the output of the angle detector 30 becomes 1V. If disturbance, such as vibrations, is applied to the tracking mirror 16 at this time so that its angle likely changes, then a restoring force occurs so as to oppose the disturbance because of the open-loop gain $G_{10}$ of the tracking servo system formed of the photo detectors 17 and 18, the first differential amplifier 19, the equalizer 20, the second differential amplifier 32, the drive amplifier 31, and the tracking mirror 16; and because of open-loop gain $G_{11}$ of the position servo system formed of the second differential amplifier 32, the drive amplifier 31 and the tracking mirror 16.

As described in the above, when the band width of the open-loop characteristic of the tracking servo system is made wide, and gain crossover frequency is made high, although the hhgh gain-bandwidth product is effective against disturbance, it results in malfunction in the presence of defects in a disc. Therefore, there is a limit for the magnitude of $G_{10}$, and it is impossible to stand against disturbance, such as vibrations, applied to the tracking mirror, with the tracking servo system. In the present invention, the open-loop gain of the position servo system is suitably set so as to prevent malfunction caused from the above-mentioned disturbance.

A further detailed embodiment of the present invention will be described.

Figure 7A:
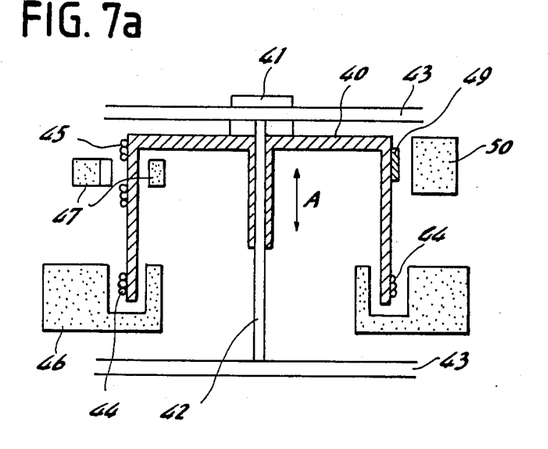
FIG. 7a a is a side cross-sectional view of a main part of the same and FIG. 7b is a partial plan view of the same.
Figure 7B:
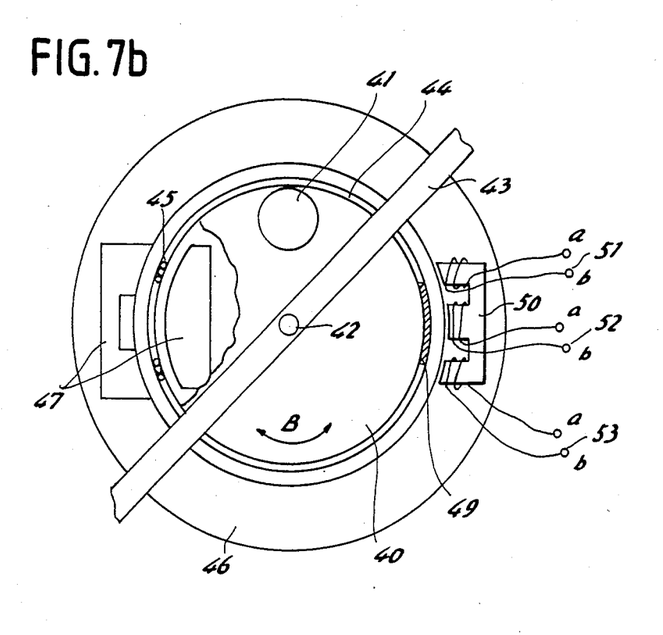

FIGS. 7a and 7b show a pickup assembly including the read lens 12 and the tracking mirror 16 of FIG. 6. The reference 41 is a read lens attached to an optical tube 40 which moves in a direction of an arrow A along a supporting shaft 42 due to the action between an annular magnetic circuit 46 and a coil 44 so that an output light beam from the read lens 41 is focussed on the disc.

Furthermore, the optical tube 40 rotates in a direction of an arrow B due to the action of a magnetic circuit 47 with a current being fed to a coil 45. Therefore, the read lens 41 is also rotated in the direction of the arrow B so that the output light beam from the read lens 41 is applied on the information track of the disc. The reference 43 is a supporting plate which supports the supporting shaft 42 at a predetermined position allowing the optical tube 40 to slide in the direction of the arrow A along the supporting shaft 42 and also to rotate in the direction B. The reference 49 is a magnetic sheet provided at a portion of a side wall of the optical tube 40, and the reference 50 is a magnetic circuit for detecting a rotational position. When a current of 50 kHz or so is applied to input terminals a, b of a coil 52, a voltage is induced across the coils 51 and 53 via the magnetic sheet 49, and therefore, the rotational angle of the optical tube 40 can be detected as a voltage with the outputs from terminals a, b of respective coils being detected and the difference therebetween being obtained. Namely, this voltage corresponds to the output from the angle detecting means 30 shown in FIG. 6.

Figure 8:
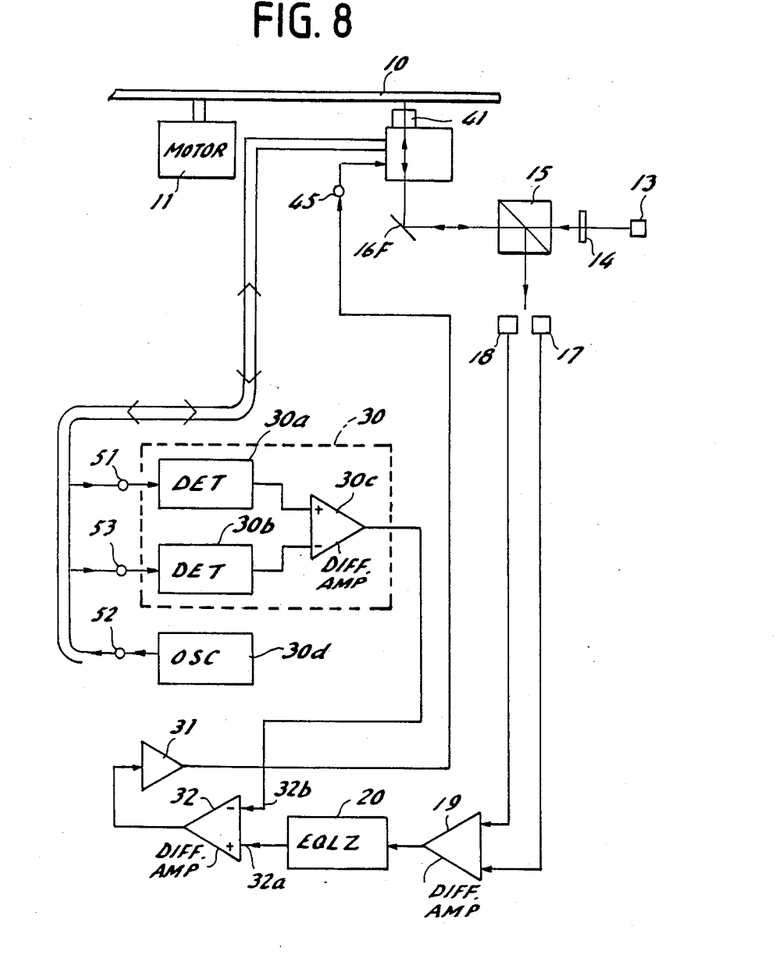
FIG. 8 is a block diagram of an embodiment of the tracking control apparatus according to the present invention.

FIG. 8 shows a block diagram of an embodiment of the present invention. FIG. 8 corresponds to FIG. 6, and output light from the beam splitter 15 is applied via a fixed mirror 16F to the read lens 41 to be incident on the track of the disc 10. Reflected light from the disc 10 is incident via the fixed mirror 16F and the beam splitter 15 on the photo detectors 17 and 18, so that the first differential amplifier 19 receives inputs to perform the above-described tracking servo operation. To the coil 52 shown in FIG. 7b is applied a current of 50 kHz or so from an oscillator 30d, and voltages are induced across the coils 51 and 53 where respective outputs are converted in d.c. voltages by way of detectors 30a and 30b, which d.c. voltages are inputted to a differential amplifier 30c. As a result, a d.c. signal indicative of variation in rotational angle of the read lens 41 is obtained at the output of the differential amplifier 30c. Namely, the angle detector 30 is formed of detectors 30a and 30b and the differential amplifier 30c. An output from the differential amplifier 30c is inputted to the second differential amplifier 32, and is then fed via the amplifier 31 to a tracking drive coil 45. The tracking error signal from the first differential amplifier 19 is inputted via the equalizer 20 to the second differential amplifier 32. Using references 32a and 32b for two inputs of the second differential amplifier 32, the voltage at 32b changes so as to be always equal to the tracking error signal at 32a, and the voltage at 32a substantially equals the voltage at 32b during operation of the tracking servo. Assuming that disturbance, such as vibrations, is applied to the read lens 41 to cause the same to move, then a voltage occurs at the output of the differential amplifier 30c, which output is supplied, via the second differential amplifier 32, and the drive amplifier 31 to the coil 45, as a current opposing the above-mentioned disturbance.

With the above structure, a reproducing apparatus which is hardly affected by disturbance, such as vibrations, can be actualized with the gain crossover frequency of the tracking servo system being maintained low.

Although a magnetic circuit has been used as an element for detecting a position in a tracking direction in the present embodiment, it is possible to optically detect the same, and furthermore pickup devices of any type can be applied as long as it is possible to detect displacement in a tracking direction.

In the pickup device shown in FIGS. 7a & 7b, in the case that the position servo system formed of 16, 30, 31 and 32 in FIG. 6 is not provided, the position in the rotational direction of the read lens cannot be determined because no neutral point exists although sensitivity is high in the tracking direction (indicated at B in the drawing) since no damper such as a spring, is provided. However, since the position servo system is added according to the present invention, the above-mentioned neutral point can be electronically determined. This point is also an advantage provided by the present invention.

The magnetic circuit 50 for detecting the position in tracking direction, shown in FIGS. 7a & 7b is arranged so that displacement in the direction of the arrow B can be detected without error even if the optical tube 40 is moved in the direction of the arrow A, and the magnetic substance 49 is always exists within an operating range with respect to the magnetic circuit 50.

POSSIBILITY OF INDUSTRIAL APPLICATION

As described in the above, according to the tracking apparatus of the present invention, since a reproducing apparatus which is hardly affected by disturbance, such as vibrations, can be actualized with the gain crossover frequency of the tracking servo system being maintained low, it is possible to actualize a reproducing apparatus of a disc-like recording medium, which operates with stability at a location where vibrations occur, as in automobiles.

TABLE OF REFERENCES IN DRAWINGS 1, 3 . . . auxiliary beams
2 . . . light beam for reading out
4 . . . tracking signal
10 . . . disc
11 . . . motor
12 . . . read lens
13 . . . light source
14 . . . diffraction grating
15 . . . beam splitter
16 . . . tracking mirror
17, 18 . . . photo detectors
19, 30c, 32 . . . differential amplifiers
20 . . . equalizer
21, 31 . . . amplifiers
30 . . . angle detector
40 . . . optical tube
41 . . . read lens
42 . . . supporting shaft
43 . . . supporting plate
44, 45 . . . coils
46, 47 . . . magnetic circuits
49 . . . magnetic sheet
50 . . . magnetic circuit
51, 52, 53 . . . coils

What is claimed is:
1. A tracking control apparatus for a disc recording and/or reproducing apparatus, comprising:
 (a) pickup means for reading information from tracks of a disc by using a light beam, said pickup means having a movable portion arranged to be displaced relative to said pickup means for effecting tracking control;
 (b) tracking error detecting means associated with said pickup means for producing a tracking error signal indicative of a difference between a position of a track to be scanned and a scanning position of said light beam determined by a position of said movable portion;

(c) displacement detecting means for producing a displacement signal indicative of a displacement of said movable portion of said pickup means relative to said pickup means;

(d) signal processing means responsive to said tracking error signal and to said displacement signal from said displacement detecting means for producing a control signal, said signal processing means including first means for processing said tracking error signal, second means for processing said displacement signal to provide quicker response to and compensation for displacement of said movable portion than provided by said first means, and a circuit for combining said processed displacement signal with said processed tracking error signal for producing said control signal;

(e) said first means operable to prevent malfunctioning of said apparatus caused by defects of the disc surface and including means for limiting bandwith of said tracking signal for preventing malfunctioning caused by defects of the disc surface; and (e) actuating means responsive to said control signal for effecting said tracking control by moving said movable portion.

2. A tracking control apparatus for a disc recording and/or reproducing apparatus, comprising:
(a) pickup means for reading information from tracks of a disc by using a light beam, said pickup means having a movable portion arranged to be displaced relative to said pickup means for effecting tracking control;
(b) tracking error detecting means associated with said pickup means for producing an error signal indicative of a difference between a position of a track to be scanned and a scanning position of said light beam determined by a position of said movable portion;
(c) displacement detecting means for producing an output signal indicative of a displacement of said movable portion of said pickup means relative to said pickup means;
(d) signal processing means responsive to said error signal and to said output signal from said displacement detecting means for producing a control signal, said signal processing means including an equalizer responsive to said error signal for limiting amplitude and bandwidth thereof, and a circuit for combining said output signal from said displacement detecting means with an output signal from said equalizer for producing said control signal; and
(e) actuating means responsive to said control signal for effecting said tracking control by moving said movable portion.

3. A tracking control apparatus as claimed in claim 2, wherein said movable portion comprises a tracking mirror for reflecting said light beam.

4. A tracking control apparatus as claimed in claim 2, wherein said movable portion comprises a lens which is positioned on a rotary member rotatable around a fixed shaft, and wherein said actuating means comprises a coil provided on said rotary member and a magnet arranged on a stationary portion of said pickup means so as to face said coil.

5. A tracking control apparatus as recited in claim 2, wherein said tracking error detecting means comprises plural photodetecting means producing plural signals as a function of deviation of said position of said light beam from said position of said track to be scanned, and difference means for obtaining a difference between said plural signals to produce said error signal.

6. A tracking control apparatus as recited in claim 5, wherein said displacement detecting means comprises magnetic means associated with said pickup means for generating a signal in response to said displacement of said movable portion of said pickup means.

7. A tracking control apparatus as recited in claim 2, wherein said displacement detecting means comprises magnetic means associated with said pickup means for generating a signal in response to said displacement of said movable portion of said pickup means.

8. A tracking control apparatus as recited in claim 7, wherein said movable portion comprises lens means mounted on rotatable tube means, and
said magnetic means comprises magnetic circuit means and coil means wound thereon for detecting displacement relative thereto of a magnetic sheet means mounted on said rotatable tube means for outputting a signal representative of rotation of said rotatable tube means.

9. A tracking control apparatus as recited in claim 8, wherein said signal processing means comprises difference means for determining a difference between said error signal and said output signal and for providing to said actuating means a further signal representative of said difference.

10. A tracking control apparatus as recited in claim 2, wherein said signal processing means comprises difference means for determining a difference between said error signal and said output signal and for providing to said actuating means a further signal representative of said difference.

11. A tracking control apparatus for a recording disc reproducing appratus, as claimed in claim 2, wherein said second means comprises a detector means for directly detecting the displacement of said movable portion, thereby to provide an output signal from said detector means correctly representing the displacement of said movable portion.

12. A tracking control apparatus as recited in claim 11, wherein said detector means comprises optical detecting means responsive to displacement of said movable portion and producing an output signal representative thereof.

13. A tracking control apparatus for a recording disc reproducing apparatus, comprising:
(a) pickup means for picking up information with a light beam by scanning information tracks on a disc-like recording medium which is rotated and driven, said pickup means having a movable portion for effecting tracking so that a position of a light spot applied to said disc-like recording medium is changed in a direction substantially normal to one of said information tracks being scanned;
(b) first means responsive to light beams received via said movable portion for producing a tracking control signal corresponding to a relative position between said light spot and one of said information tracks being scanned;
(c) an equalizer responsive to said tracking control signal for limiting amplitude and bandwidth of said tracking control signal;

(d) second means for producing an output signal corresponding to the displacement of said movable portion relative to said pickup means;

(e) third means responsive to an output signal from said equalizer and to said output signal from said second means for producing a resultant control signal; and (f) movable portion drive means for moving said movable portion relative to said pickup means for effecting said tracking in response to said tracking control signal.

14. A tracking control apparatus for a recording disc reproducing appratus, as claimed in claim 13, wherein said second means comprises a detector means for directly detecting the displacement of said movable portion, thereby to provide an output signal from said detector means correctly representing the displacement of said movable portion.

15. A tracking control apparatus as recited in claim 14, wherein said detector means comprises electromagnetic detecting means responsive to displacement of said movable portion and producing an output signal representative thereof.

16. A tracking control apparatus for a recording disc reproducing apparatus, as claimed in claim 13, further comprising a differential amplifier, wherein said tracking control signal and said output signal corresponding to the displacement of said movable portion are fed to different input terminals of said differential amplifier, and wherein an output of said differential amplifier is fed to said movable portion drive means.

17. A tracking control apparatus for a recording disc reproducing apparatus, as claimed in claim 13, wherein said movable portion comprises a tracking mirror rotatably supported for reflecting said light beam.

18. A tracking control apparatus for a recording disc reproducing apparatus, as claimed in claim 13, wherein said movable portion comprises a lens which is positioned on a rotary member rotatable around a fixed shaft, and wherein said movable portion drive means comprises a coil provided on said rotary member and a magnet arranged on a stationary portion of said pickup means so as to face said coil.

* * * * *